US011752789B2

(12) United States Patent
Arakane

(10) Patent No.: US 11,752,789 B2
(45) Date of Patent: Sep. 12, 2023

(54) PRINTING APPARATUS, CONTROL METHOD FOR THE PRINTING APPARATUS, AND MEDIUM STORING PROGRAM

(71) Applicant: BROTHER KOGYO KABUSHIKI KAISHA, Nagoya (JP)

(72) Inventor: Satoru Arakane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/355,594

(22) Filed: Jun. 23, 2021

(65) Prior Publication Data

US 2021/0402814 A1 Dec. 30, 2021

(30) Foreign Application Priority Data

Jun. 24, 2020 (JP) ................................. 2020-108737

(51) Int. Cl.
*B41J 19/14* (2006.01)
*B41J 25/00* (2006.01)
*G06K 15/10* (2006.01)
*G06K 15/02* (2006.01)
*B41J 19/20* (2006.01)

(52) U.S. Cl.
CPC ........... *B41J 25/006* (2013.01); *B41J 19/142* (2013.01); *B41J 19/202* (2013.01); *G06K 15/105* (2013.01); *G06K 15/1822* (2013.01)

(58) Field of Classification Search
CPC ........ B41J 29/393; B41J 29/38; B41J 19/142; B41J 19/202; G06K 15/105; G06K 15/1822
USPC ................................................ 347/14, 19, 37
See application file for complete search history.

(56) References Cited

U.S. PATENT DOCUMENTS 7,980,646 B2 * 7/2011 Mukaiyama ......... B41J 13/0018
347/14

FOREIGN PATENT DOCUMENTS

JP  2005-212232 A  8/2005
JP  2010-12663 A   1/2010

* cited by examiner

*Primary Examiner* — Julian D Huffman
(74) *Attorney, Agent, or Firm* — Merchant & Gould P.C.

(57) ABSTRACT

A printing apparatus includes a head to discharge liquid, a carriage to support the head and reciprocate in a forward direction and a backward direction, and a controller. The controller executes a printing process to print one image in a plurality of copies by discharging the liquid from the head while moving the carriage in the forward direction and the backward direction, based on a print job for printing the one image in the plurality of copies, and a first determining process to determine a moving direction of the carriage for second and following copies, based on a moving result of the carriage in printing for the first copy in the printing process.

9 Claims, 8 Drawing Sheets

Fig. 1
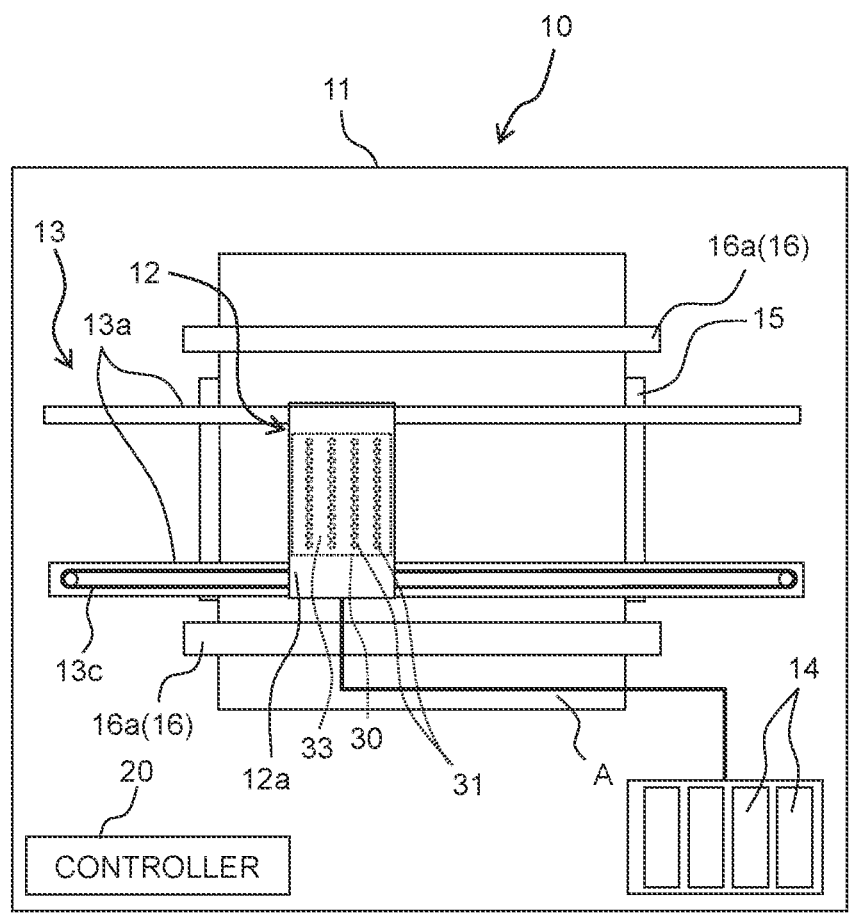
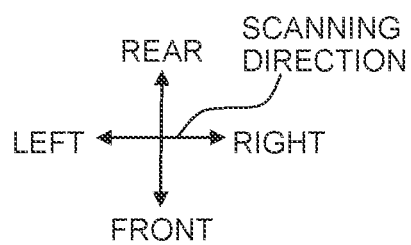

Fig. 3
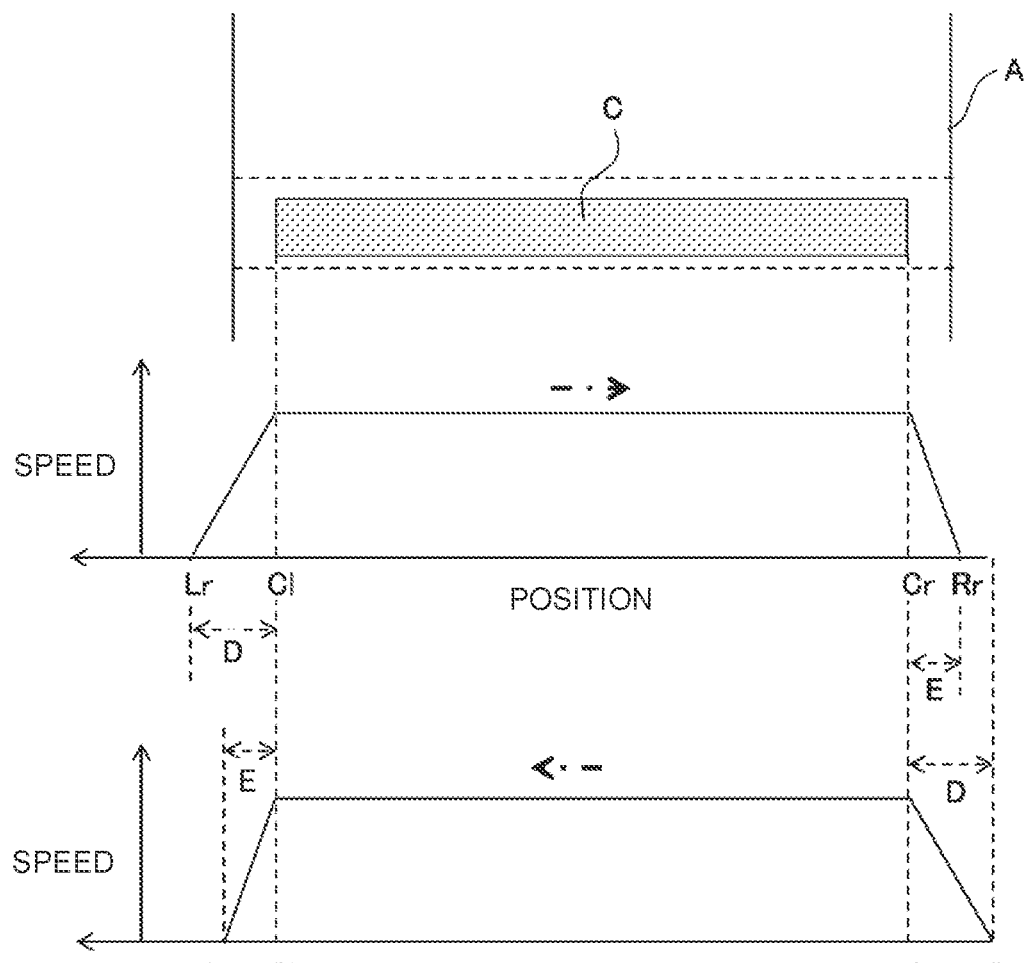
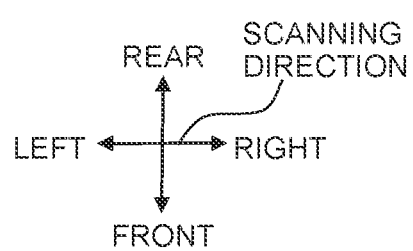

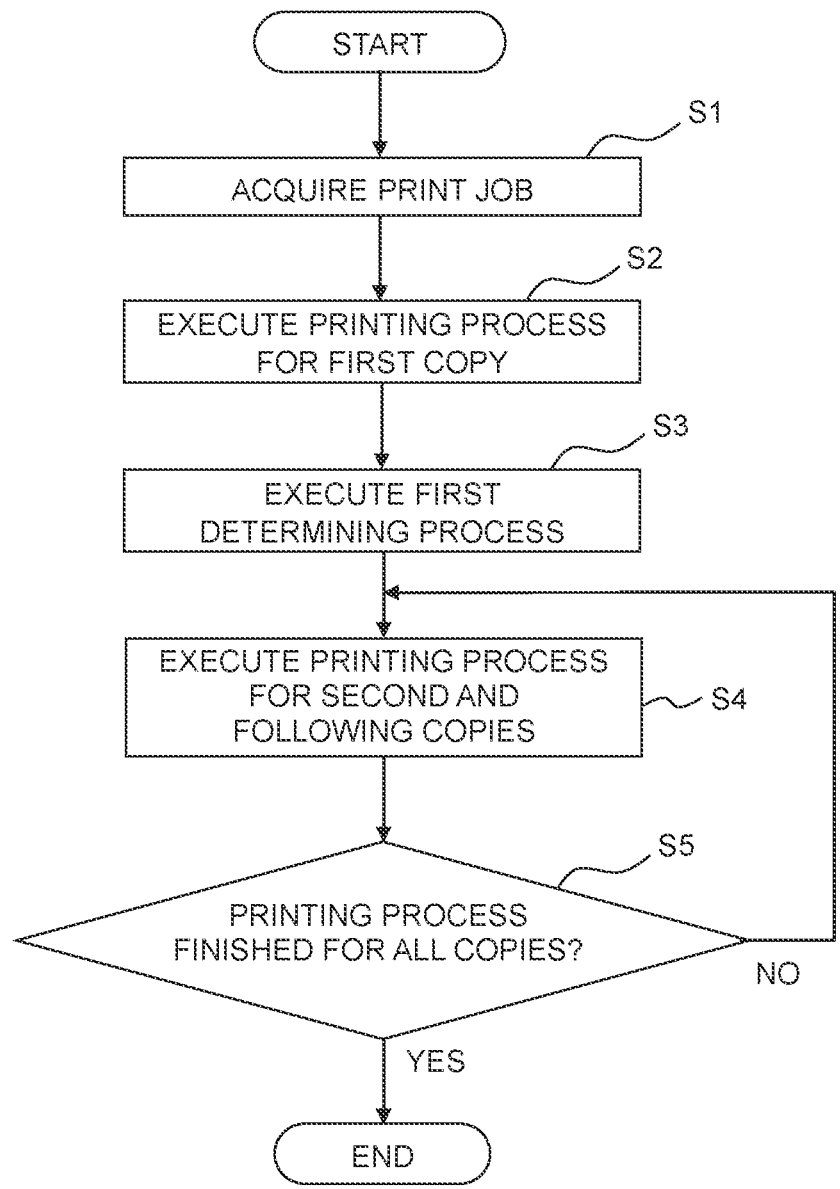

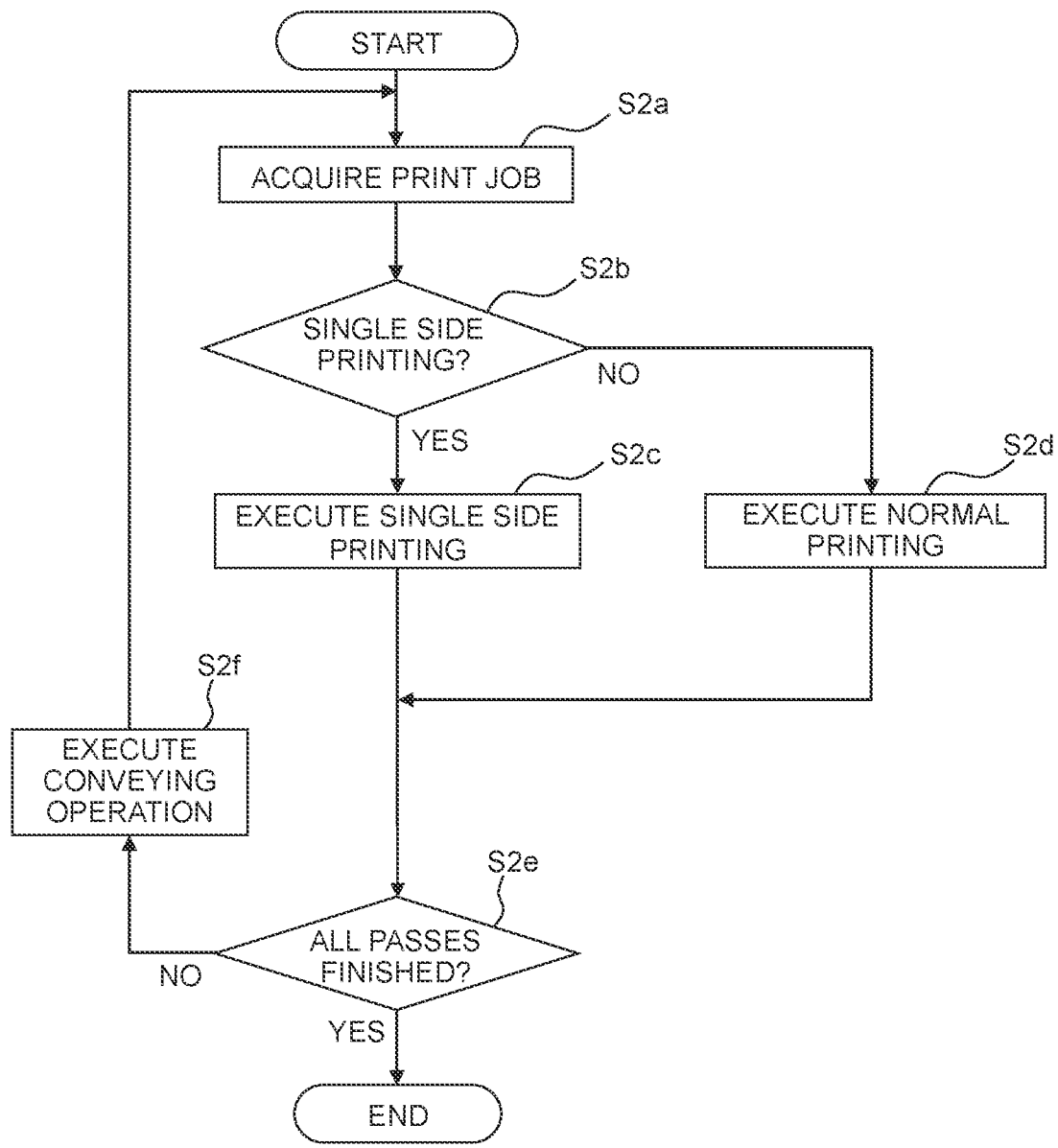

PRINTING APPARATUS, CONTROL METHOD FOR THE PRINTING APPARATUS, AND MEDIUM STORING PROGRAM

CROSS REFERENCE TO RELATED APPLICATION

The present application claims priority from Japanese Patent Application No. 2020-108737, filed on Jun. 24, 2020, the disclosure of which is incorporated herein by reference in its entirety.

BACKGROUND

Field of the Invention

The present invention relates to a printing apparatus, a control method for the printing apparatus, and a program for the printing apparatus.

Description of the Related Art

Japanese Patent Application Laid-open No. 2005-212232 discloses a printing apparatus known as a conventional printing apparatus. In this printing apparatus, a printing method is designed and determined to minimize the total moving distance of the printing head in print jobs.

SUMMARY

In the printing apparatus disclosed in Japanese Patent Application Laid-open No. 2005-212232, all print jobs are received and, on the basis of all print jobs, a printing method is determined. Thereafter, printing is started on the basis of the print jobs. Therefore, if a plurality of copies are printed, then printing for the first copy takes much time.

The present teaching is made in view of the above phenomenon, and an object thereof is to provide a printing apparatus, a control method for the printing apparatus, and a program for the printing apparatus, which are capable of printing in a timely and efficient manner.

According to a first aspect of the present teaching, there is provided a printing apparatus including:
a head configured to discharge liquid;
a carriage configured to support the head and reciprocate in a forward direction and a backward direction; and
a controller,
wherein the controller is configured to execute:
a printing process to print one image in a plurality of copies by discharging the liquid from the head while moving the carriage in the forward direction and the backward direction, based on a print job for printing the one image in the plurality of copies; and
a first determining process to determine a moving direction of the carriage for second and following copies, based on a moving result of the carriage in printing for a first copy in the printing process, and
wherein the controller is configured to determine the moving direction of the carriage for the second and following copies in the first determining process, such that a moving time of the carriage in printing for the second copy is equal to or shorter than the moving time of the carriage in printing for the first copy, or a moving distance of the carriage in the printing for the second copy is equal to or shorter than the moving distance of the carriage in the printing for the first copy.

According to a second aspect of the present teaching, there is provided a control method for a printing apparatus including a head configured to discharge liquid, a carriage configured to support the head and reciprocate in a forward direction and a backward direction, and a controller, the control method including:
a printing process to print one image in a plurality of copies by discharging the liquid from the head while moving the carriage in the forward direction and the backward direction, based on a print job for printing the one image in the plurality of copies; and
a first determining process to determine a moving direction of the carriage for second and following copies, based on a moving result of the carriage in printing for a first copy in the printing process,
wherein in the first determining process, the moving direction of the carriage for the second and following copies is determined such that a moving time of the carriage in printing for the second copy is equal to or shorter than the moving time of the carriage in printing for the first copy, or a moving distance of the carriage in the printing for the second copy is equal to or shorter than the moving distance of the carriage in the printing for the first copy.

According to a third aspect of the present teaching, there is provided a non-transitory medium storing a program for controlling a printing apparatus including a head configured to discharge liquid, a carriage configured to support the head and reciprocate in a forward direction and a backward direction, and a controller, the program causing the controller to execute:
a printing process to print one image in a plurality of copies by discharging the liquid from the head while moving the carriage in the forward direction and the backward direction, based on a print job for printing the one image in the plurality of copies; and
a first determining process to determine a moving direction of the carriage for second and following copies, based on a moving result of the carriage in printing for a first copy in the printing process,
wherein in the first determining process, the program causes the controller to determine the moving direction of the carriage for the second and following copies such that a moving time of the carriage in printing for the second copy is equal to or shorter than the moving time of the carriage in printing for the first copy, or a moving distance of the carriage in the printing for the second copy is equal to or shorter than the moving distance of the carriage in the printing for the first copy.

The present teaching has the configurations explained above, thereby exerting such an effect as capable of providing a printing apparatus, a control method for the printing apparatus, and a program for the printing apparatus, which are capable of printing in a timely and efficient manner.

The above object, other objects, characteristics and advantages of the present teaching will be manifested from a detailed explanation of an embodiment made as follows, referring to the accompanied drawings.

BRIEF DESCRIPTION OF THE DRAWINGS

FIG. 1 is a schematic diagram of a printing apparatus according to an embodiment of the present teaching, as viewed from above.

FIG. 3 is a graph showing a relation between a moving speed and a position of a carriage.

FIG. 5 is a flow chart showing an example of control method for the printing apparatus.

FIG. 8 is a flow chart showing an example of a printing process for the first copy in the control method of a printing apparatus according to a fourth modified embodiment of the present teaching.

DESCRIPTION OF THE EMBODIMENT

Figure 2:
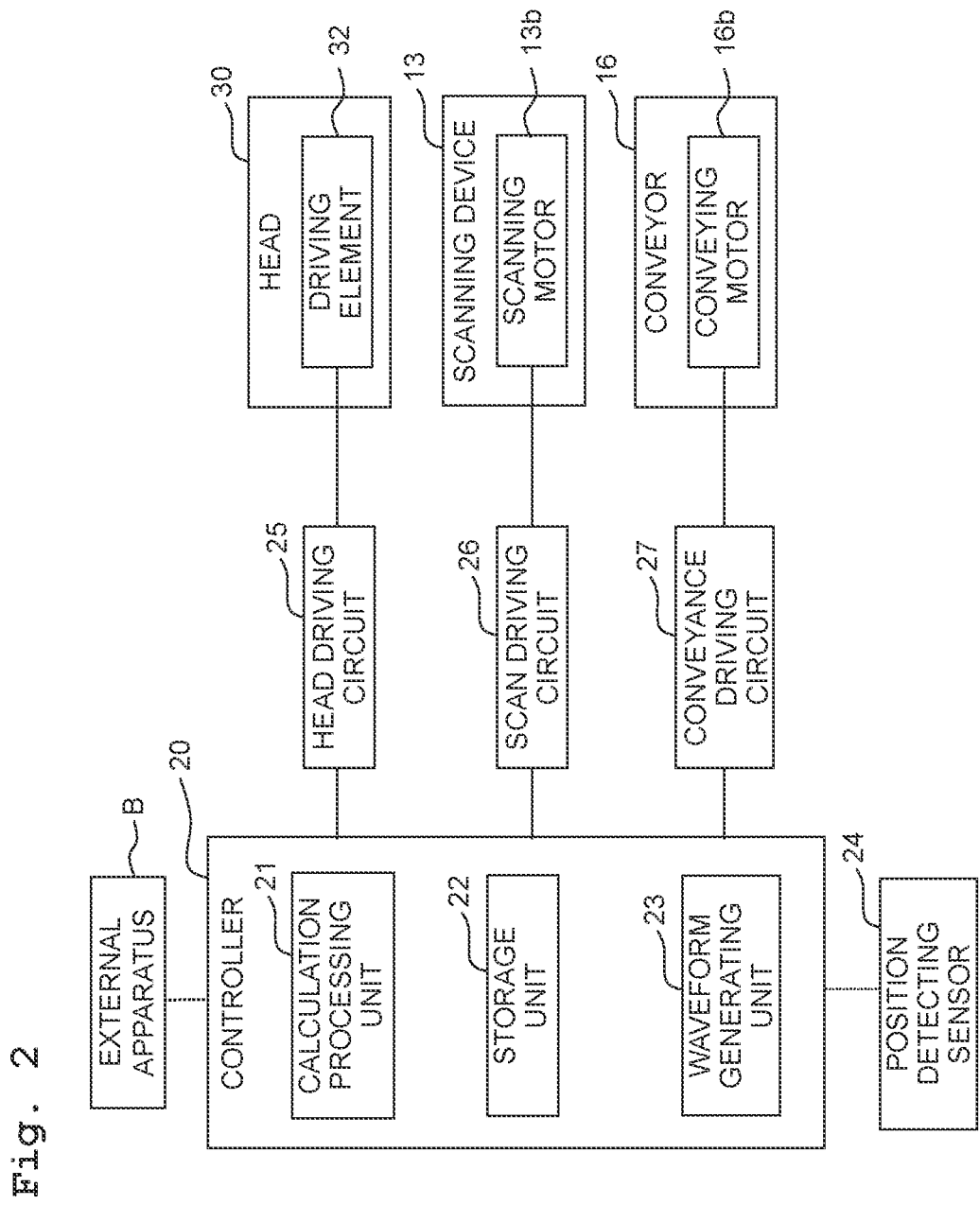
FIG. 2 is a functional block diagram showing a configuration of the printing apparatus.

Hereinbelow, referring to the accompanied drawings, an embodiment of the present teaching will be explained. Note that identical referential signs will be assigned below to identical or equivalent elements through all drawings, for which any repetitive explanations be omitted.

<Configuration of a Printing Apparatus>

A printing apparatus 10 according to an embodiment of the present teaching is configured, as shown in FIG. 1, to print by way of discharging a liquid such as an ink or the like to a printing medium A. The printing apparatus 10 is, for example, an ink jet printer. The printing apparatus 10 adopts a serial head method, including a casing 11, a head 30, a scanning device 13, a storage tank 14, a platen 15, a conveyor 16, and a controller 20.

Note that the part siding the head 30 from the platen 15 is referred to as "up" or "upper" whereas the opposite side is referred to as "down" or "lower". Further, "front" or "frontward" refers to the direction along which the conveyor 16 conveys the printing medium A (the conveyance direction) whereas "rear" or "rearward" refers to the opposite side. Further, "right" or "rightward" refers to one sideward direction whereas "left" or "leftward" refers to the other sideward direction between a forward direction and the backward direction along which the scanning device 13 moves the head 30 reciprocatingly (the scanning direction). The scanning direction intersects the conveyance direction (orthogonally for example). However, the direction of arranging the printing apparatus 10 is not limited to the above. Further, the controller 20 will be described in detail later on.

The head 30 has nozzles 31, a driving element 32 (FIG. 2), and a flow channel formation body. The flow channel formation body is formed internally with a liquid flow channel and with the nozzles 31 opening in its lower surface (a discharging surface 33). The plurality of nozzles 31 align in a front/rear direction to constitute a plurality of nozzle arrays (four arrays for example). The driving element 32 is constructed of a piezoelectric element or the like to drive such that the liquid flow channel may change in volume. By virtue of this, the meniscuses of the openings of the nozzles 31 vibrate to discharge liquid droplets (liquid drops) such that images are printed on the printing medium A.

The scanning device 13 has, for example, a carriage 12a, two guide rails 13a, a scanning motor 13b (FIG. 2), and an endless belt 13c. The carriage 12a supports the head 30, and moves the head 30 to reciprocate rightward or leftward. The guide rails 13a extend in a left/right direction to support the carriage 12a. The endless belt 13c extends in the left/right direction along the guide rails 13a, and is fixed on the carriage 12a and connected to the scanning motor 13b via a pulley. With the motion of the endless belt 13c being driven by the scanning motor 13b, the carriage 12a and the head 30 supported by the former reciprocate in the left/right direction along the guide rails 13a.

The storage tank 14 is, for example, a cartridge attachable to and removable from the casing 11, being provided according to each type of the liquid. For example, there are provided four storage tanks 14 storing respectively the inks of black, yellow, cyan and magenta. Each storage tank 14 is connected to the liquid flow channel of the head 30 by a tube to supply the liquid to the nozzles 31 of the corresponding nozzle array.

The platen 15 has a flat upper surface on which the printing medium A is supported. The platen 15 determines the distance between the printing medium A and the discharging surface 33 of the head 30 arranged to face the former.

The conveyor 16 has, for example, two conveyance rollers 16a and a conveying motor 16b (FIG. 2). The two conveyance rollers 16a are arranged parallel to each other such that their rotary shafts may extend in the left/right direction, interposing the platen 15 in the front/rear direction. The conveyance rollers 16a are linked to the conveying motor 16b and, when driven by the conveying motor 16b, rotate to convey the printing medium A on the platen 15 frontward.

<Configuration of the Controller>

As shown in FIG. 2, the controller 20 is connected to an external device B such as a computer, a network or the like via an I/F, receiving various data such as print jobs and the like from the external device B. The print jobs are data for printing images on the printing medium A, including, for example, image data and format data.

An image data is, for example, a raster data expressing a print object image by dividing the image into a plurality of pixels, including positional information and color information of the pixels. The color information may be exemplified by RGB values expressed by gradation values of R (red) G (green) B (blue), and CMYK values expressed by gradation values of C (cyan) M (magenta) Y (yellow) K (black). Further, a format data is, for example, a data indicating a print method, including information such as the number of copies to print for the same image, a print mode, and the like. For example, the format data may be information inputted by a user using an input device.

Further, the controller 20 is connected to a position detecting sensor 24. The position detecting sensor 24 is configured to detect a position of the carriage 12a in the left/right direction. For example, the position detecting sensor 24 may be an encoder, outputting a detected position of the carriage 12a to the controller 20.

The controller 20 has a calculation processing unit 21, a storage unit 22, and a waveform generating unit 23. The storage unit 22 is a memory accessible by the calculation processing unit 21, and is constructed of RAM, ROM, and the like. The RAM stores various data temporarily. Examples of the various data are print jobs, data converted by the calculation processing unit 21, and positional information detected by the position detecting sensor 24. The ROM stores programs for processing the various data. Note that the programs may be acquired from the external device B or be stored in another storage medium.

The calculation processing unit 21 is constructed from a processer such as a CPU or the like, an integrated circuit such as an ASIC or the like, and other components. The calculation processing unit 21 carries out various processes by executing the programs stored in the ROM to control the driving element 32, the scanning motor 13b and the conveying motor 16b. For example, the controller 20 carries out a printing process and a first determining process. Those processes will be described later on.

The waveform generating unit 23 generates a waveform signal to define the waveform of a drive signal outputted by the driving element 32. The waveform generating unit 23 may be a devoted circuit or be constructed from the calculation processing unit 21 and the storage unit 22. The waveform signal is, for example, a pulse signal, including a plurality of types of waveform signal for different amounts of the liquid droplets discharged from the nozzles 31.

Based on a print job, the calculation processing unit 21 selects one type of waveform signal from the plurality of types of waveform signal according to each nozzle 31 or each drive period, to generate a waveform selecting data. On this occasion, the calculation processing unit 21 generates the waveform selecting data according to the liquid droplet amount of each one droplet based on the print job.

The controller 20 is connected to a head driving circuit 25 and the head driving circuit 25 is connected to the driving element 32. The controller 20 outputs the waveform signal and the waveform selecting data to the head driving circuit 25, and the head driving circuit 25 converts the waveform signal and the selecting data into the drive signal for the driving element 32 and outputs the same to the driving element 32. By virtue of this, the driving element 32 drives according to the drive signal to change the volume of the liquid flow channel whereby a pressure is applied to the liquid in the nozzles 31 which thus discharge the liquid droplets of the amount according to the print job.

Further, the controller 20 is connected to the scanning motor 13b via a scan driving circuit 26 and connected to the conveying motor 16b via a conveyance driving circuit 27. The controller 20 controls the driving of the scanning motor 13b with the scan driving circuit 26 on the basis of the print job. The controller 20 controls the driving of the conveying motor 16b with the conveyance driving circuit 27 on the basis of the print job. By virtue of this, the controller 20 controls the timing of driving and stopping, the rotating speed, the rotating amount and the like of the scanning motor 13b and the conveying motor 16b. Further, the controller 20 controls the motion of the carriage 12a and the conveyance of the printing medium A.

<Printing Process>

Based on a print job for printing a plurality of copies of the same image, the controller 20 carries out the printing process by discharging the liquid from the head 30 while moving the carriage 12a in the forward direction and the backward direction.

In the printing process, the controller 20 causes the storage unit 22 to store the print job acquired from the external device B, and causes the storage unit 22 to store the print jobs into which the print job was divided according to each pass. If the image data of this print job is in RGB values, then the controller 20 converts the RGB values into the CMYK values on the basis of a predetermined corresponding relation. Further, the controller 20 may execute a halftone process on the image data on the basis of the error diffusion method. Note that the external device B may divide the print job according to each pass, and output the divided print jobs to the printing apparatus 10. On this occasion, the controller 20 causes the storage unit 22 to store the acquired print jobs.

The controller 20 alternately carries out a pass and a conveying operation on the basis of the print job by sequentially outputting the plurality of divided print jobs to the head driving circuit 25, the scan driving circuit 26, and the conveyance driving circuit 27. The pass includes a discharging pass and a non-discharging pass. The discharging pass includes a scanning operation and a discharging operation. The non-discharging pass does not include the discharging operation but includes the scanning operation. In the discharging operation, the liquid is discharged from the nozzles 31. In the conveying operation, the printing medium A is conveyed frontward through a distance predetermined or according to the print job.

In the scanning operation, the carriage 12a is moved rightward or leftward. The carriage 12a changes in moving direction alternately between the rightward direction and the leftward direction according to each pass. By virtue of this, in the next pass to the pass of moving rightward, the carriage 12a moves leftward to the opposite side, and then in the following pass, the carriage 12a moves rightward to the opposite side to the former.

In a double-direction print, a pass image is printed through the discharging pass where the carriage 12a moves in any one direction of the rightward and leftward directions and, after carrying out the conveying operation in the following step, the carriage 12a moves in the other direction to print the pass image through the discharging pass. In this manner, by alternately repeating the discharging pass and the conveying operation, the pass image according to each discharging pass is aligned in the conveyance direction for the printing medium A and thus the image according to the print job is printed. Therefore, the pass image is formed also in any of the rightward moving passes and the leftward moving passes.

In a single-direction print, the carriage 12a moves in any one direction of the rightward and leftward directions while the liquid is discharged. However, when the carriage 12a moves in the other direction in the next pass following the former pass via the conveying operation, no liquid is discharged. Therefore, in a single-direction print, the discharging pass and the non-discharging pass are alternately carried out interposing a conveying operation, and the pass image is formed in the discharging pass between the two passes.

In this manner, in the printing process, the calculation processing unit 21 of the controller 20 moves the carriage 12a in a predetermined direction when printing is started for the first copy in the printing process, and then changes in moving direction from the predetermined direction to the opposite direction to cause the printing process to proceed while alternately changing the directions. For example, if a cap covers the discharging surface 33 of the head 30 at the right side of the platen 15, then the printing process is started for the first copy after removing the cap from the head 30. On this occasion, the predetermined direction may be the leftward direction toward the platen 15 from the cap. Further, after the cap is removed from the head 30, the printing process may be started for the first copy after carrying out a flushing process by discharging the liquid from the head 30 to a receiver at the left side of the platen 15. On this occasion, the predetermined direction may be the rightward direction toward the platen 15 from the receiver.

Whenever the controller 20 carries out a pass based on a print job, the carriage 12a moves either rightward or leftward. For each pass, the calculation processing unit 21 acquires the left end (to be referred to below as "the left moving end"), and the right end (to be referred to below as "the right moving end") in the moving range of the carriage 12a, from the position detecting sensor 24. Each moving end is associated with the pass and then stored in the storage unit 22. The storage unit 22 may store those positions in the form of coordinate positions or scales of the encoder. By carrying out the same according to each pass, the respective moving ends of the carriage 12a are accumulated for the plurality of passes of the printing process for the first copy.

The right moving end is at the right end in the range for the carriage 12a to move in a pass, where the carriage 12a stops moving after having moved rightward or where the carriage 12a starts moving leftward. The left moving end is at the left end in the range for the carriage 12a to move in a pass, where the carriage 12a stops moving after having moved leftward or where the carriage 12a starts moving rightward.

The controller 20 lets the storage unit 22 store a print job as it is until the printing process is ended for the print copies designated in the print job. Then, the controller 20 carries out the printing process while copying the print job stored in the storage unit 22 for printing each copy. Then, if the designated copies are all printed, then the controller 20 deletes the print job from the storage unit 22.

Note that the print job may not include any format data. In such a case, the controller 20 acquires the print jobs equal in number to the print copies of the same image from the external device B. The controller 20 causes the storage unit 22 to store the acquired print jobs and causes the storage unit 22 to store the print jobs divided according to each pass. Then, the controller 20 deletes the print jobs from the storage unit 22 whenever printing the image is finished with the corresponding print jobs.

<First Determining Process>

The controller 20 carries out a first determining process to determine the moving direction of the carriage 12a from the second copy on the basis of the moving result of the carriage 12a in printing the first copy in the printing process. In the first determining process, the controller 20 determines the moving direction of the carriage 12a from the second copy such that the moving distance of the carriage 12a in printing the second copy be equal to or shorter than the moving distance of the carriage 12a in printing the first copy.

Note that the first determining process will be explained below with the case of the double-direction print. However, the first determining process is carried out for the single-direction print in the same manner as for the double-direction print. On this occasion, the moving distance of the carriage 12a both in a discharging pass and in a non-discharging pass is included in the moving distance of the carriage 12a for printing each copy.

In particular, if the printing process for the first copy is finished, then the calculation processing unit 21 of the controller 20 acquires each moving end of the carriage 12a in printing the first copy from the storage unit 22 according to each pass. Then, the controller 20 calculates the distance between the right moving end and the left moving end according to each pass, and summates the distances of all passes to calculate the moving distance of the carriage 12a in the printing process for the first copy. Note that the moving distance of the carriage 12a in each pass may be calculated whenever one or a plurality of passes is/are finished.

In this context, based on a difference between an acceleration distance D and a deceleration distance E of the carriage 12a according to the moving distance, the controller 20 may adjust each moving end of the carriage 12a. For example, as shown in FIG. 3, in the pass (rightward pass) where the carriage 12a moves rightward, the carriage 12a accelerates up to a predetermined speed before reaching the first discharging position (the left end Cl of a discharging area C; to be referred to below as "the left discharging end Cl") from the left moving end Lr. Then, from the left discharging end Cl, the carriage 12a moves at a predetermined constant speed until reaching the last discharging position in the pass (the right end Cr of the discharging area C; to be referred to below as "the right discharging end Cr), and then decelerates from the right discharging end Cr to stop at the right moving end Rr.

The acceleration and deceleration are alternated or exchanged depending on the moving direction of the carriage 12a. Therefore, in the pass (leftward pass) where the carriage 12a moves leftward, the carriage 12a accelerates before reaching the right discharging end Cr of the discharging area C from the right moving end Rl. Then, the carriage 12a moves at the constant speed in the discharging area C from the right discharging end Cr to the left discharging end Cl, and stops at the left moving end Ll.

If the acceleration distance D is different from the deceleration distance E, then the respective moving ends are different according to the moving direction of the carriage 12a. For example, if the deceleration distance E is shorter than the acceleration distance D, then the right moving end Rl in a leftward pass is positioned at the right side of the right moving end Rr in a rightward pass, while the left moving end Ll in the leftward pass is positioned at the right side of the left moving end Lr in the rightward pass.

Hence, the controller 20 specifies the left discharging end Cl by subtracting the predetermined acceleration distance D from the left moving end Lr in the rightward pass such that it is possible to calculate the left moving end Ll in the leftward pass by adding the predetermined deceleration distance E to the left discharging end Cl. Further, the controller 20 specifies the right discharging end Cr by adding the predetermined deceleration distance E to the right moving end Rr in the rightward pass such that it is possible to calculate the right moving end Rl in the leftward pass by subtracting the predetermined acceleration distance D from the right discharging end Cr. Note that much the same is true on the case of computing each moving end of the rightward pass from the leftward pass. Then, the controller 20 calculates the moving distance of the carriage 12a on the basis of the found respective moving ends.

Figure 4A:
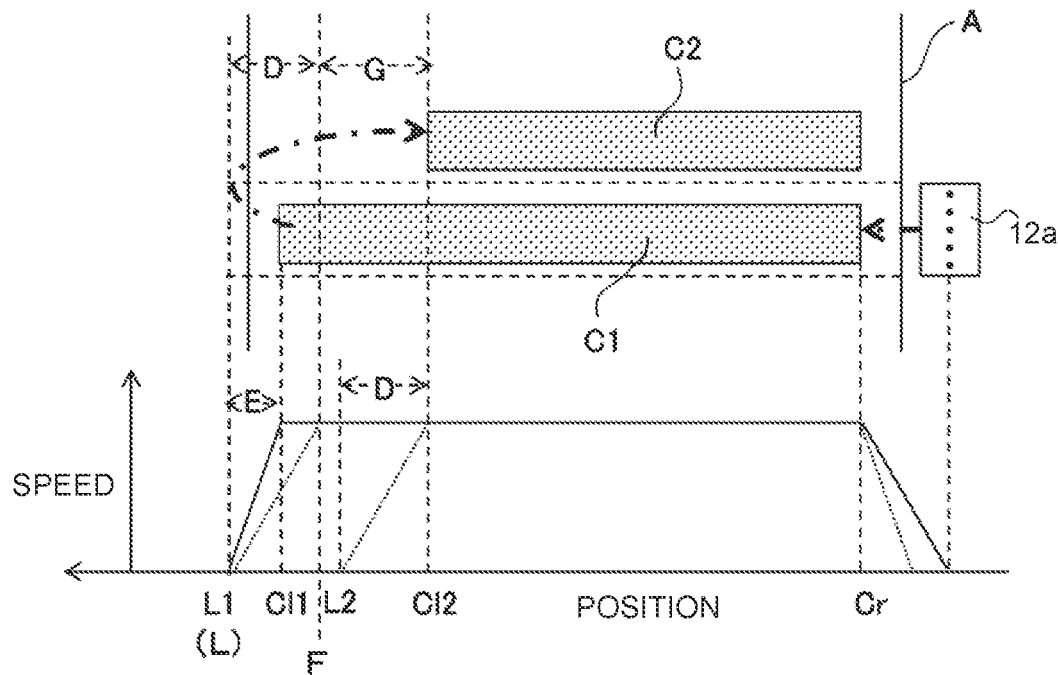
FIG. 4A is a graph showing a relation between the moving speed and the position of the carriage when the left end of a discharging area for the next pass is positioned at the right side farther than at the left end of a discharging area for the current pass.
Figure 4B:
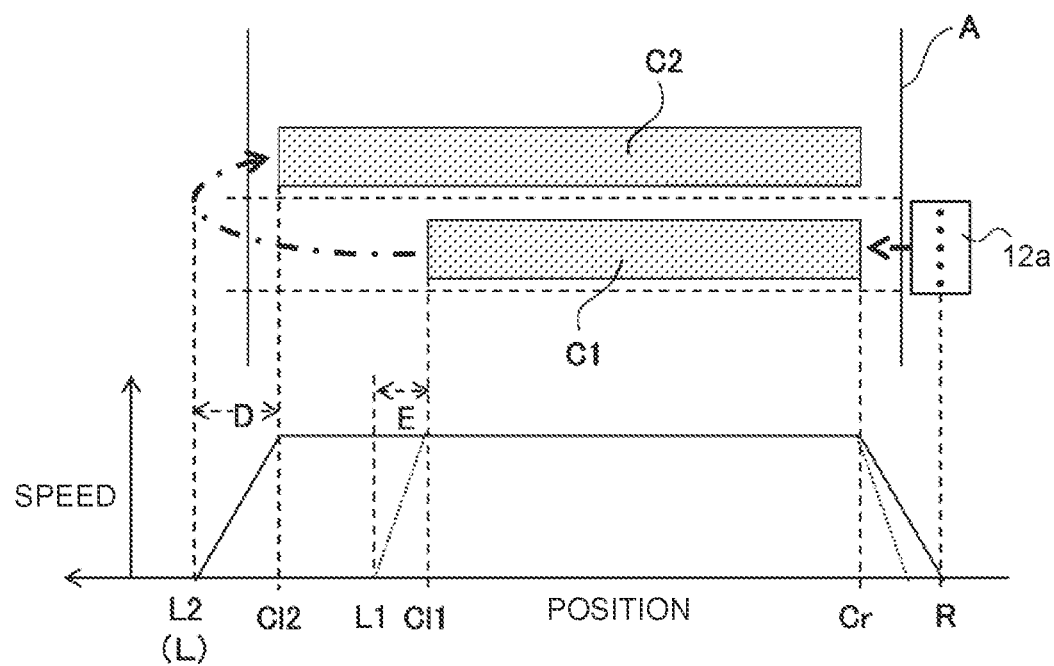
FIG. 4B is a graph showing a relation between the moving speed and the position of the carriage when the left end of the discharging area for the next pass is positioned at the left end farther than the left side of the discharging area for the current pass.

Further, the controller 20 may adjust the respective moving ends of the carriage 12a on the basis of a positional relation between the respective discharging ends of the discharging area C in the current pass and the respective discharging ends of the discharging area C in the next pass. For example, as shown in FIGS. 4A and 4B, in the current pass, the leftward pass performs printing whereas in the next pass, the rightward pass performs printing. The controller 20 calculates a left moving end L1 resulted from adding the deceleration distance E in the leftward direction from the end point of the current discharging area C1 (a left discharging end Cl1), and a left moving end L2 resulted from adding the acceleration distance D in the leftward direction from the start point of the next discharging area C2 (a left discharging end Cl2).

In the case shown in FIG. 4A, the left moving end L2 in the next pass is farther in the moving direction (rightward direction) for the next pass than the left moving end L1 in the current pass. In this case, the controller 20 does not need to return the carriage 12a to the opposite direction (leftward) in the moving direction from the left moving end L1 to the left moving end L2 for the next pass. Therefore, the controller 20 causes the storage unit 22 to store the left moving end L1 in the current pass as a left moving end L in the current pass. By virtue of this, after the carriage 12a is moved leftward up to the left moving end L (L1) in the current pass, the carriage 12a is moved rightward from the left moving end L (L1) in the next pass.

On the other hand, in the case shown in FIG. 4B, the left moving end L2 in the next pass is farther in the opposite direction (leftward) to the moving direction (rightward) for the next pass than the left moving end L1 in the current pass. In this case, the controller 20 causes the storage unit 22 to store the left moving end L2 for the next pass as the left moving end L in the current pass so as not to move the carriage 12a in the opposite direction (rightward) to the moving direction from the left moving end L1 to the left moving end L2 for the next discharging area C2 in the next pass. By virtue of this, after the carriage 12a is moved leftward up to the left moving end L (L2) in the current pass, the carriage 12a is moved rightward from the left moving end L (L2) for the next pass.

In this manner, the controller 20 adjusts each moving end of the carriage 12a on the basis of the positional relation between the current discharging area C1 and the next discharging area C2 to calculate the moving distance of the carriage 12a. Note that much the same is true on adjusting the right moving end position of the carriage 12a on the basis of the positional relation between the right discharging end Cr of the current discharging area C1 and the right discharging end Cr of the next discharging area C2, as adjusting the left moving end L of the carriage 12a on the basis of the positional relation between the left discharging end Cl1 of the current discharging area C1 and the left discharging end Cl1 of the next discharging area C2. Further, if the acceleration distance D is equal to the deceleration distance E, then the moving end of the carriage 12a may be adjusted on the basis of the relational position between the discharging end of the current discharging area C1 and the discharging end of the next discharging area C2.

In this manner, the controller 20 calculates the moving distance of the carriage 12a for each pass according to each case where the moving direction of the carriage 12a is supposed to be rightward or leftward at the time of starting to print the second copy, and summates the respective moving distances for all passes in printing the second copy so as to calculate the moving distance of the carriage 12a for printing the second copy. Then, the controller 20 compares the moving distance when the moving direction on starting to print is rightward with the moving distance when the moving distance when the moving direction on starting to print is leftward, so as to determine the moving direction of the shorter moving distance as the initial moving direction for the second copy and cause the storage unit 22 to store the same.

If the moving direction at the time of starting to print the second copy is the same as the moving direction at the time of starting to print the first copy, then the moving distance in printing the second copy is the same as the moving distance in printing the first copy. On the other hand, if the moving direction at the time of starting to print the second copy is different from the moving direction at the time of starting to print the first copy, then the moving distance in printing the second copy is shorter than the moving distance in printing the first copy. Hence, in the first determining process, the moving distance of the carriage 12a in printing the second copy is equal to or shorter than the moving distance of the carriage 12a in printing the first copy.

Note that the controller 20 can find, respectively, the moving distance of the carriage 12a at the constant speed, the times of the constant speed from the acceleration distance D and the deceleration distance E, the acceleration time, and the deceleration time, based on the predetermined constant speed, accelerating speed and the decelerating speed of the carriage 12a. Therefore, by finding the moving distance by the above method and converting the same into the moving time, it is possible for the controller 20 in the first determining process to determine the moving direction of the carriage 12a from the second copy such that the moving time of the carriage 12a in printing the second copy may be equal to or shorter than the moving time of the carriage 12a in printing the first copy.

Further, the speed of the carriage 12a moving in the discharging area is different according to the print mode. The speed of the carriage 12a is faster in the high speed mode where the printing speed is prior to the image quality than in the high image quality mode where the image quality is prior to the printing speed. The faster the moving speed of the carriage 12a, the longer the acceleration distance D and the deceleration distance E. Hence, the acceleration distance D and the deceleration distance E change according to the print mode, and the storage unit 22 stores in advance a corresponding relation between the print mode and the acceleration distance D and deceleration distance E. On the basis of the predetermined corresponding relation, the controller 20 may acquire the acceleration distance D and the deceleration distance E according to the print mode, thereby adjusting each moving end of the carriage 12a for printing the first copy.

<Control Method for Printing Apparatus>

The method of the printing apparatus 10 is realized by, for example, the controller 20 according to the flow chart of FIG. 5. First, on acquiring a print job (step S1), the controller 20 carries out the printing process for the first copy (step S2). On this occasion, the controller 20 divides the print job according to each pass and outputs the print jobs successively to each drive circuit. By virtue of this, if a pass image is printed on the printing medium A on the basis of the print job, then the printing medium A is conveyed frontward. By repeating this step, the pass images are aligned in the front/rear direction to form the image based on the print job.

On this occasion, the controller 20 acquires the right moving end and the left moving end of the carriage 12a in each pass, and causes the storage unit 22 to store the same. Then, the controller 20 adjusts each moving end of the carriage 12a on the basis of the accelerating/decelerating moving distance, and the positional relation of the discharging areas between the current and the next. Then, the controller 20 calculates the moving distance of the carriage 12a in each pass on the basis of each moving end and calculates the summated moving distance for each case where printing the second copy is started in the rightward direction or in the leftward direction.

Then, the controller 20 carries out the first determining process on the basis of the moving distance in printing the first copy (step S3). In the first determining process, the controller 20 compares the moving distance when printing the second copy is started in the rightward direction with the moving distance when printing the second copy is started in the leftward direction, and finds the direction with the moving distance being shorter when the printing is started.

By virtue of this, the controller 20 determines the moving distance of the carriage 12a from the second copy and causes the storage unit 22 to store the same such that the moving distance of the carriage 12a in printing the second copy may be equal to or shorter than the moving distance of the carriage 12a in printing the first copy.

The controller 20 moves the carriage 12a in the moving direction determined in the first determining process while carrying out the printing process on the second and following copies, to print the same image as the first copy (step S4). Then, the controller 20 carries out the printing process (step S4), that is, (if the step S5 is No) until the printing process is finished with all copies based on the print job. If the printing process is finished with all copies (step S5: Yes), then the controller 20 ends the control.

In this manner, in the first determining process, the controller 20 determines the moving distance of the carriage 12a from the second copy such that the moving distance of the carriage 12a in printing the second copy may be equal to or shorter than the moving distance of the carriage 12a in printing the first copy. By virtue of this, after printing the first copy, the printing method for the second copy is determined on the basis of the moving result of the head 30. Therefore, it is possible to start printing the first copy immediately and to facilitate shortening the time for printing the second and following copies by the determined printing method.

Further, in the printing process, the controller 20 causes the carriage 12a to move in the predetermined direction which is either the forward direction or the backward direction when printing the first copy is started. In the first determining process, the controller 20 determines whether the carriage 12a is moved in the forward direction or in the backward direction when printing the second and following copies is started. By virtue of this, in printing the first copy, it is possible to save the time for determining the moving direction of the head 30 and thus to start printing the first copy immediately.

First Modified Embodiment

In a printing apparatus 10 according to a first modified embodiment, the controller 20 carries out a first deciding process to decide whether or not the same image is printed in three or more copies on the basis of a print job. In the printing process, if it is decided in the first deciding process that the same image is printed in three or more copies, then the second and following copies are printed on the basis of the moving direction determined in the first determining process. If it is decided in the first deciding process that less than three copies are printed, then the first determining process is not carried out.

Figure 6:
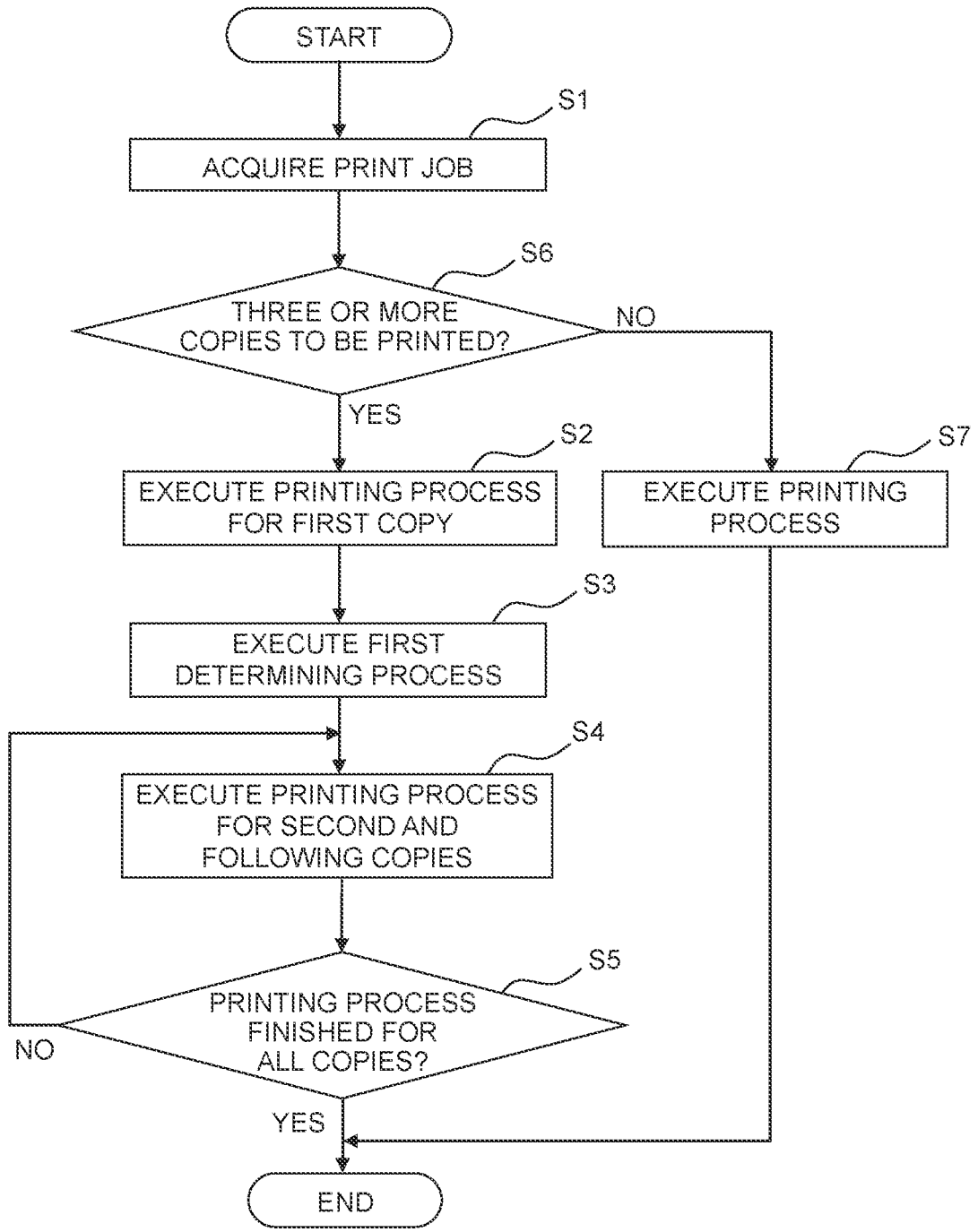
FIG. 6 is a flow chart showing an example of control method for a printing apparatus according to a first modified embodiment of the present teaching.

In particular, according to the flow chart shown in FIG. 6, the controller 20 realizes the control method for the printing apparatus 10. In the flow chart shown in FIG. 6, the step S6 is carried out between the step S1 and the step S2 of the flow chart of FIG. 5.

That is, if the controller 20 acquires a print job (step S1), then it refers to the format data of the print job to decide whether or not the same image is printed in three or more copies (the number of print copies) according to the format data (step S6). On this occasion, if the number of print copies is less than three (step S6: No), then the controller 20 carries out the printing process for one or two copies in the step S7. By virtue of this, the image based on the print job is printed in one or two copies. On this occasion, the controller 20 may acquire the moving end of the carriage 12a from the position detecting sensor 24 in the printing process for the first copy, and cause the storage unit 22 to store the same.

If the number of print copies is two, then the controller 20 lets the predetermined direction be the moving direction of the carriage 12a on starting to print the first copy and, thereafter, changes the moving direction between the rightward direction and the leftward direction alternately according to each pass. Then, the controller 20 lets the moving direction on starting to print the second copy be the opposite direction to the moving direction in the last pass in the process of printing the first copy, and moves the carriage 12a accordingly. After that, the controller 20 changes the moving direction of the carriage 12a alternately according to each pass while causing the printing process to proceed. In this manner, by omitting the first determining process when there is a small number of print copies, it is possible to facilitate shortening the printing time.

On the other hand, in the step S6, if the number of print copies is three or more (step S6: Yes), then the controller 20 carries out the process of printing the first copy (step S2). Then, the controller 20 carries out the first determining process on the basis of the moving distance in printing the first copy, determines the moving direction of the carriage 12a for the second and following copies, and causes the storage unit 22 to store the same (step S3). The controller 20 carries out the printing process for the second and following copies (step S4), that is, (if the step S5 is No) while moving the carriage 12a in the determined moving direction until the printing process is finished with all copies based on the print job. Then, if the printing process is finished with all copies (step S5: Yes), then the controller 20 ends the control.

Second Modified Embodiment

In a printing apparatus 10 according to a second modified embodiment, if the controller 20 decides that the same image is printed in three or more copies on the basis of a print job by the first deciding process in the first modified embodiment, then it carries out a second deciding process to decide whether or not the sum of the number of passes where the carriage 12a moves forward and the number of passes where the carriage 12a moves backward in printing the first copy is an odd number. If the controller 20 decide that the number of passes is an odd number in the second deciding process, then it carries out the second determining process to determine that the moving direction of the carriage 12a on staring to print the first copy of two successive copies from the second copy be the direction where the carriage 12a has a shorter moving time or shorter moving distance needed for printing the two copies between the forward direction and the backward direction. If it is decided that the number of passes is not an odd number in the second deciding process, then the first determining is carried out.

Note that in a single-direction print, the discharging passes and the non-discharging passes are carried out alternately to form the pass image in the discharging passes; therefore, the sum of passes in printing each copy is an even number. Hence, the second determining process is carried out in a double-direction print. However, the second determining process may also be carried out in a single-direction print.

Figure 7:
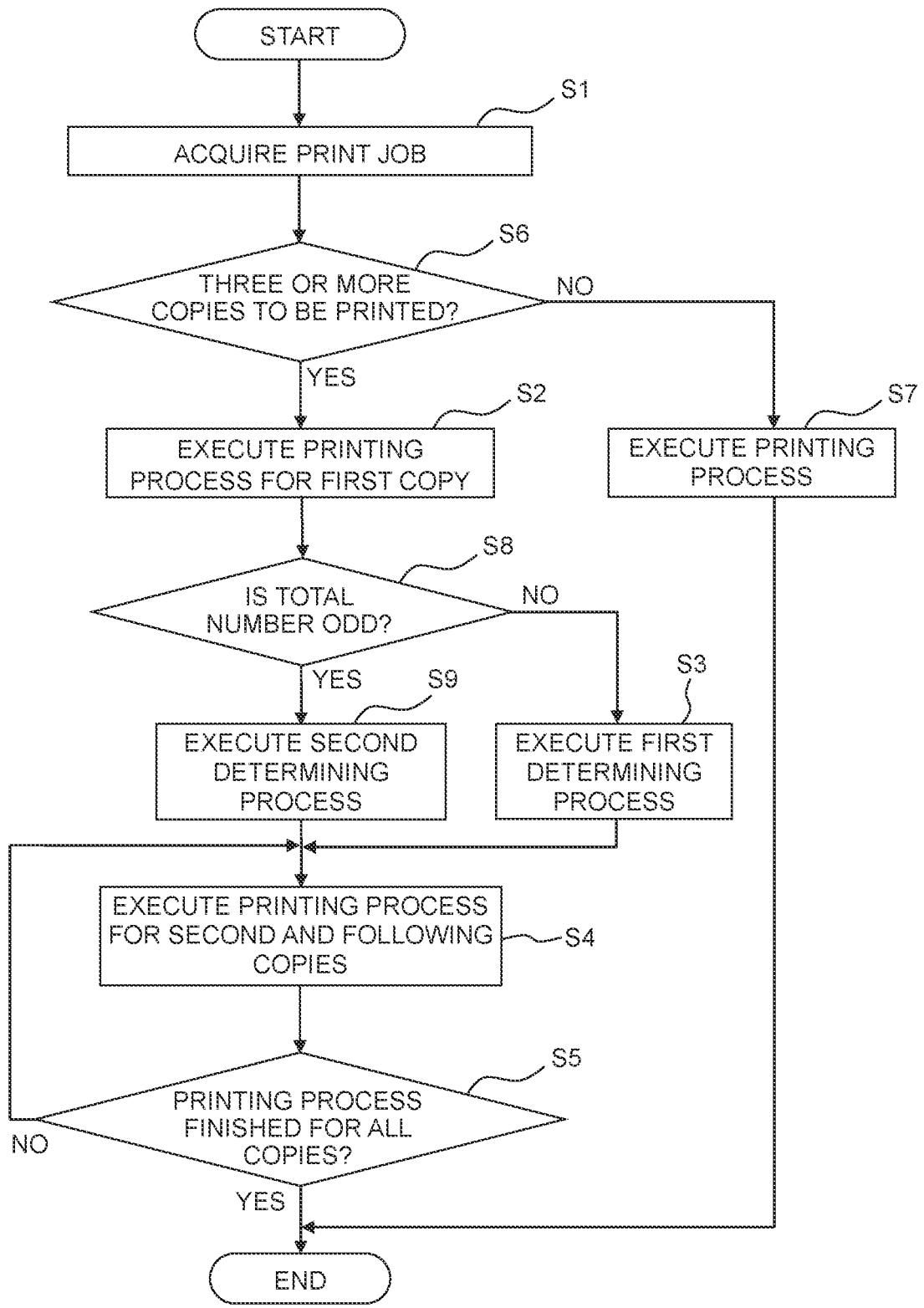
FIG. 7 is a flow chart showing an example of control method for a printing apparatus according to a second modified embodiment of the present teaching.

In particular, the control method for the printing apparatus 10 is realized by the controller 20 according to the flow chart shown in FIG. 7. In the flow chart shown in FIG. 7, the steps S8 and S9 are carried out between the step S2 and the step S4 of the flow chart of FIG. 6.

That is, the controller 20 acquires a print job (step S1) and, based on the format data, if the same image is printed in three or more copies (step S6: Yes), then the controller 20 carries out the process of printing the first copy (step S2). On this occasion, the controller 20 counts the number of passes where the carriage 12a moves rightward and the number of passes where the carriage 12a moves leftward, in the course of the printing process. Then, the controller 20 summates the number of rightward passes and the number of leftward passes to calculate the total number of passes in the printing process for the first copy.

The controller 20 determines whether or not the total number of passes is an odd number (step S8). If the total number of passes is an even number (step S8: No), then the moving direction of the carriage 12a on starting to print the first copy (or the second copy as another example) of two successive copies is the same as the moving direction of the carriage 12a on starting to print the second copy (or the third copy as the other example) following the first copy. Therefore, because the controller 20 may determine the moving direction of the carriage 12a one copy after another from the second copy, it carries out the first determining process (step S3). By virtue of this, if the moving direction of the carriage 12a is determined in the printing process for the second copy, then the printing process proceeds also in this moving direction from the third copy.

On the other hand, in the step S8, if the total number of passes of the first copy is an odd number (step S8: Yes), then the moving direction of the carriage 12a on starting to print the first copy (or the second copy as another example) is opposite to the moving direction of the carriage 12a on starting to print the second copy (or the third copy as the other example) following the first copy. Hence, the controller 20 carries out the second determining process (step S9) for determining the moving direction of the carriage 12a for every two copies from the second copy.

Here, the storage unit 22 stores the left moving end and the right moving end of the carriage 12a according to each pass in the course of printing the first copy. The controller 20 adjusts each moving end of the carriage 12a on the basis of the accelerating/decelerating moving distance, and the positional relation of the discharging areas between the current and the next, according to the moving direction of the carriage 12a. Then, the controller 20 lets the predetermined direction be the moving direction of the carriage 12a for the first copy, and lets the opposite direction be the moving direction for the second copy, on the basis of each moving end. Under this condition, then, the controller 20 calculates the moving distance in printing the first copy and the moving distance in printing the second copy, to calculate the total moving distance of every two copies by summating the above two moving distances. Further, the controller 20 lets the predetermined direction be the moving direction of the carriage 12a for the second copy, and lets the opposite direction be the moving direction for the first copy, on the basis of each moving end. Under this condition, then, the controller 20 calculates the moving distance in printing the first copy and the moving distance in printing the second copy, to calculate the total moving distance of every two copies by summating the above two moving distances.

Then, the controller 20 compares the total moving distance in the case of starting to move in the predetermined direction for the first copy with the total moving distance in the case of starting to move in the opposite direction for the first copy. Based on the result of this comparison, the controller 20 determines the moving direction with the shorter total moving distance as the moving direction on starting to print the second copy, and causes the storage unit 22 to store the same.

The controller 20 carries out the printing process for the second and following copies while moving the carriage 12a in the determined direction (step S4). Then, if the printing process is finished with all copies (step S5: Yes), then the controller 20 ends the control. In this manner, if the total number of passes of the first copy is an odd number, then as far as the moving direction for the first copy of two successive copies is determined, the moving direction for the second copy is determined accordingly. Therefore, by organizing those items, it is possible to efficiently determine the moving direction of the carriage 12a.

Third Modified Embodiment

With a printing apparatus 10 according to a third modified embodiment, in any one of the embodiment and the modified embodiments 1 and 2, the controller 20 carries out a speed changing process to change the moving speed of the carriage 12a in the printing process according to the range (discharging area) of discharging the liquid from the head 30. The controller 20 carries out the first determining process based on the moving speed of the carriage 12a changed in the speed changing process.

In particular, in the printing process for the first copy, the controller 20 acquires each discharging end of the discharging area in each pass from the position detecting sensor 24 and causes the storage unit 22 to store the same together with each moving end of the moving range of the carriage 12a in each pass. The controller 20 carries out the speed changing process based on the moving end and the discharging end.

For example, as shown in FIG. 4A, the controller 20 causes the carriage 12a to move at a constant speed in the current discharging area C1 between the right discharging end Cr and the left discharging end Cl1, and in the next discharging area C2 between the right discharging end Cr and the left discharging end Cl2. By virtue of this, it is possible to reduce the deviation of the liquid landing position due to a change in the moving speed of the carriage 12a, thereby suppressing decrease in the image quality due to the deviation of the landing position.

On the other hand, the head 30 does not discharge the liquid in the range (the non-discharging area G) from the acceleration end position F as far away as from the left moving end L plus the acceleration distance D, to the start point of the next discharging area C2 (the left discharging end Cl2). Therefore, the controller 20 brings on a faster moving speed of the carriage 12a in the non-discharging area G than in the current discharging area C1 and the next discharging area C2. By carrying out the speed changing process in this manner, it is possible to shorten the moving time of the carriage 12a.

Hence, in the first determining process, the controller 20 adjusts each moving end of the carriage 12a on the basis of the accelerating/decelerating moving distance and the positional relation between the current and the next discharging areas, according to the moving direction of the carriage 12a. Then, the controller 20 calculates the moving distance of the carriage 12a on the basis of each moving end and converts the moving distance into the moving time on the basis of a predetermined moving speed of the carriage 12a. On this occasion, by the speed changing process of bringing on a faster moving speed in the non-discharging area G than in the discharging area, the controller 20 adjusts the moving time of the carriage 12a.

In this manner, the controller 20 calculates the moving time for the case where printing the second copy is started with the carriage 12a moving in the predetermined direction and the moving time for the case where printing the second copy is started with the carriage 12a moving in the opposite direction. Then, compering those two times, the controller 20 determines the moving direction with the shorter moving time as the moving direction on starting to print the second copy, and causes the storage unit 22 to store the same.

In this manner, the controller 20 carries out the first determining process on the basis of the moving speed of the carriage 12a changed by the speed changing process. By virtue of this, it is possible to suppress decrease in the image quality in the discharging area while facilitating shortening the printing time from the second copy with the printing direction determined in the first determining process.

Fourth Modified Embodiment

With a printing apparatus 10 according to a fourth modified embodiment, in any one of the embodiment and the modified embodiments 1 to 3, the controller 20 carries out a third deciding process in the printing process for the first copy but does not execute the same in the printing process for the second copy. The third deciding process is to decide whether or not a single side printing is carried out to print only in either one of the forward direction and the backward direction but not to print in the other direction, on the basis of the color information of the image to be printed for a print job. Further, the controller 20 carries out the first determining process such that the single side printing may be carried out in a smaller number of times in the printing process for the second copy.

In particular, as shown in FIG. 1, the head 30 is provided with four nozzle arrays, for example. The four nozzle arrays are the cyan nozzle array for discharging the cyan ink, the magenta nozzle array for discharging the magenta ink, the yellow nozzle array for discharging the yellow ink, and the black nozzle array for discharging the black ink. For example, letting the cyan nozzle array be at the left side of the black nozzle array, those arrays are aligned in the above-described order in the left/right direction.

If the color inks other than the black ink are discharged while the carriage 12a is moving leftward, then the inks are overlaid in the order of the cyan ink, the magenta ink and the yellow ink from the side of the printing medium A in the up/down direction. On the other hand, if the color inks are discharged while the carriage 12a is moving rightward, then the inks are overlaid in the order of the yellow ink, the magenta ink and the cyan ink from the side of the printing medium A in the up/down direction. In this manner, if the carriage 12a moves in the opposite direction, then the inks are overlaid in the opposite order. According to the overlaid pattern, it is possible to see the color formed by the overlaid inks differently from each other. In such a case, the single side printing is carried out.

In this context, the controller 20 determines whether or not the single side printing is carried out on the basis of a print job. For example, the controller 20 carries out the process of the steps S2a to S2f according to the flow chart shown in FIG. 8, in the printing process for the first copy of the step S2 shown in FIGS. 5 to 7. Note that the single side printing is carried out in passes including the parts where the color is seen differently according to the moving direction of the carriage 12a. Therefore, the single side printing is carried out in all or part of the passes in a double side printing and the single side printing carried out for all passes of a print job.

That is, in the printing process for the first copy, on acquiring a print job divided according to each pass (step S2a), the controller 20 carries out the third deciding process (step S2b). In the third deciding process, based on the image data of the print job, the controller 20 divides the print object image into pass images and divides a pass image into a plurality of blocks in predetermined areas. Then, the controller 20 acquires a plurality of RBG values included in the blocks from the image data and acquires the weights corresponding to the RBG values. The RBG values and the weights are preset and stored in the storage unit 22. The weight is the difference in color recognized by an observer observing an image and is the degree of difference in color due to a different order of overlaying the inks. The greater the weight, the higher the degree of the difference between the color where the liquids are discharged and overlaid in the rightward moving and the color where the liquids are discharged and overlaid in the leftward moving.

The controller 20 summates the plurality of weights included in a block, divides the resulted sum by the block area, and calculates the weight per unit area. On calculating the weight per unit area for each block, the controller 20 determines whether or not there is any block exceeding a predetermined threshold value. In a block exceeding the predetermined threshold value, there is a greater degree than a predetermined value of the difference in color due to the difference in moving direction.

Therefore, the controller 20 determines to execute the single side printing by moving the carriage 12a in a predetermined direction (the forward direction for example) regardless of the moving direction of the carriage 12a in the previous pass for the pass image including the block exceeding the predetermined threshold value (step S2b: Yes). Then, the controller 20 causes the storage unit 22 to store the pass for the single side printing while performing the single side printing based on the print job with that pass (step S2c). In this single side printing, the controller 20 moves the carriage 12a in the predetermined direction while printing the pass image by discharging the liquid from the head 30. This pass image has colors which have a comparatively greater difference in color according to the moving direction but, because it is printed in the predetermined direction, the difference in color is restrained from being distinct.

On the other hand, if the pass image does not include any block exceeding the predetermined value (step S2b: No), then the controller 20 carries out an ordinary printing for that pass image (step S2d). In the ordinary printing, the liquid is discharged from the head 30 while the carriage 12a is moved in the opposite direction to the moving direction of the carriage 12a in the previous pass. By virtue of this, because the carriage 12a moves in the opposite direction to the direction of the pass right before the current pass, it is possible to facilitate shortening the printing time.

Then, if the printing process for the first copy is not yet finished with all passes (step S2e: No), then the controller 20 carries out the conveying operation on the printing medium A (step S2f), and then returns the process to the step S2a to repeat the steps therefrom. On the other hand, if the printing process for the first copy is finished with all passes (step S2e: Yes), then the controller 20 ends the printing process for the first copy.

The third deciding process is carried out in the printing process for the first copy but not carried out in the printing process for the second copy. By virtue of this, because the third deciding process is omitted in the printing process for the second copy, it is possible to facilitate shortening the printing time.

Then, in the process of the step S3 shown in FIGS. 5 to 7, the controller 20 may execute the first determining process such that the single side printing may be carried out in a smaller number of times in the printing process for the second copy. On this occasion, the controller 20 alternately conducts the moving direction to the rightward direction and the leftward direction in the order of passes for each case of starting to print rightward and starting to print leftward. Then, the controller 20 determines the moving direction of the carriage 12a in the printing process for the second copy such that there are more passes with the conducted direction as the predetermined direction than as the opposite direction in the passes of the single side printing. By virtue of this, the single side printing for the second copy is carried out in fewer times, thereby shortening the distance through which the carriage 12a moves for the single side printing. Hence, the moving direction of the carriage 12a is determined for the second and following copies such that the moving distance of the carriage 12a for printing the second copy may be equal to or shorter than the moving distance of the carriage 12a for printing the first copy. Therefore, it is possible to facilitate shortening the printing time.

Note that as far as not excluding and/or contradicting each other, the above embodiment and all modified embodiments may combine one another. Further, from the above explanation, it is obvious to those skilled in the art to allow for a number of improvements and other embodiments of the present teaching. Therefore, the above explanation should be understood as merely one example and provided for the purpose to present the best mode of the present teaching to those skilled in the art. It is possible to change the details of the structure and/or the function in practice without departing from the true spirit and scope of the present teaching.

The liquid discharging apparatus, the control method and program therefor of the present teaching are usable for printing apparatuses, the control method and program therefor which are capable of carrying out printing at high speeds.

What is claimed is:

1. A printing apparatus comprising:
   a head configured to discharge liquid;
   a carriage configured to support the head and reciprocate in a forward direction and a backward direction; and
   a controller,
   wherein the controller is configured to execute:
      a printing process to print one image in a plurality of copies by discharging the liquid from the head while moving the carriage in the forward direction and the backward direction, based on a print job for printing the one image in the plurality of copies; and
      a first determining process to determine a moving direction of the carriage for second and following copies, based on a moving result of the carriage in printing of all passes where the carriage moves in the forward direction and/or the backward direction for a first copy in the printing process, and
   wherein the controller is configured to determine the moving direction of the carriage for the second and following copies in the first determining process, such that a total moving time of the carriage in printing of all passes where the carriage moves in the forward direction and/or the backward direction for the second copy is equal to or shorter than a total moving time of the carriage in printing of all passes where the carriage moves in the forward direction and/or the backward direction for the first copy, or a total moving distance of the carriage in the printing of all passes where the carriage moves in the forward direction and/or the backward direction for the second copy is equal to or shorter than a total moving distance of the carriage in the printing of all passes where the carriage moves in the forward direction and/or the backward direction for the first copy.

2. The printing apparatus according to claim 1, wherein the controller is configured to:
   move the carriage either in the forward direction or in the backward direction, on starting of the printing for the first copy; and
   in the first determining process, determine the moving direction of the carriage either in the forward direction or in the backward direction, on starting of the printing for the second and following copies.

3. The printing apparatus according to claim 1, wherein the controller is further configured to execute a first deciding process to decide whether the one image is to be printed in three or more copies based on the print job, and
wherein in the printing process, the controller is configured to:
   print the second and following copies based on the moving direction determined in the first determining process, in a case of deciding that the one image is to be printed in three or more copies in the first deciding process; and
   not to execute the first determining process in a case of deciding that the one image is to be printed in less than three copies in the first deciding process.

4. The printing apparatus according to claim 3, wherein in a case of deciding in the first deciding process that the one image is to be printed in three or more copies based on the print job, the controller is configured to execute a second deciding process to decide whether the sum of the number of passes where the carriage moves in the forward direction and the number of passes where the carriage moves in the backward direction in the printing for the first copy is an odd number,
wherein in a case of deciding in the second deciding process that the sum is an odd number, the controller is configured to execute a second determining process to determine the moving direction of the carriage on starting to print the first copy of two successive copies from the second copy to be one of the forward direction and the backward direction which causes shorter moving time or moving distance of the carriage needed for printing the two copies, and
wherein in a case of deciding in the second deciding process that the sum is not an odd number, the controller is configured to execute the first determining process.

5. The printing apparatus according to claim 1, wherein in the printing process, the controller is further configured to execute a speed changing process to change a moving speed of the carriage according to a range of discharging the liquid from the head, and
wherein the controller is configured to execute the first determining process based on the moving speed of the carriage changed in the speed changing process.

6. The printing apparatus according to claim 1, wherein the controller is configured to execute a third deciding process to decide whether a single side printing is to be executed based on color information of the image to be printed for the print job in the printing process for the first copy, and not to execute the third deciding process in the printing process for the second copy, and wherein in the single side printing, the controller is configured to cause the head to discharge the liquid while moving the carriage in one of the forward direction and the backward direction, and not to cause the head to discharge the liquid while moving the carriage in the other of the forward direction and the backward direction.

7. The printing apparatus according to claim 6, wherein the controller is configured to execute the first determining process such that the number of executing the single side printing is decreased in the printing process for the second copy.

8. A control method for a printing apparatus including a head configured to discharge liquid, a carriage configured to support the head and reciprocate in a forward direction and a backward direction, and a controller, the control method comprising:

a printing process to print one image in a plurality of copies by discharging the liquid from the head while moving the carriage in the forward direction and the backward direction, based on a print job for printing the one image in the plurality of copies; and a first determining process to determine a moving direction of the carriage for second and following copies, based on a moving result of the carriage in printing of all passes where the carriage moves in the forward direction and/or the backward direction for a first copy in the printing process, wherein in the first determining process, the moving direction of the carriage for the second and following copies is determined such that a total moving time of the carriage in printing of all passes where the carriage moves in the forward direction and/or the backward direction for the second copy is equal to or shorter than a total moving time of the carriage in printing of all passes where the carriage moves in the forward direction and/or the backward direction for the first copy, or a total moving distance of the carriage in the printing of all passes where the carriage moves in the forward direction and/or the backward direction for the second copy is equal to or shorter than a total moving distance of the carriage in the printing of all passes where the carriage moves in the forward direction and/or the backward direction for the first copy.

9. A non-transitory medium storing a program for controlling a printing apparatus including a head configured to discharge liquid, a carriage configured to support the head and reciprocate in a forward direction and a backward direction, and a controller, the program causing the controller to execute:

a printing process to print one image in a plurality of copies by discharging the liquid from the head while moving the carriage in the forward direction and the backward direction, based on a print job for printing the one image in the plurality of copies; and a first determining process to determine a moving direction of the carriage for second and following copies, based on a moving result of the carriage in printing of all passes where the carriage moves in the forward direction and/or the backward direction for a first copy in the printing process, wherein in the first determining process, the program causes the controller to determine the moving direction of the carriage for the second and following copies such that a total moving time of the carriage in printing of all passes where the carriage moves in the forward direction and/or the backward direction for the second copy is equal to or shorter than a total moving time of the carriage in printing of all passes where the carriage moves in the forward direction and/or the backward direction for the first copy, or a total moving distance of the carriage in the printing of all passes where the carriage moves in the forward direction and/or the backward direction for the second copy is equal to or shorter than a total moving distance of the carriage in the printing of all passes where the carriage moves in the forward direction and/or the backward direction for the first copy.

* * * * *